United States Patent
Ford

(10) Patent No.: US 7,599,831 B2
(45) Date of Patent: Oct. 6, 2009

(54) MULTI-STAGE PATTERN REDUCTION FOR NATURAL LANGUAGE PROCESSING

(75) Inventor: W. Randolph Ford, Marriotsville, MD (US)

(73) Assignee: Sonum Technologies, Inc., Baltimore, MD (US)

( * ) Notice: Subject to any disclaimer, the term of this patent is extended or adjusted under 35 U.S.C. 154(b) by 493 days.

(21) Appl. No.: 11/271,202

(22) Filed: Nov. 10, 2005

(65) Prior Publication Data

US 2006/0167678 A1 Jul. 27, 2006

Related U.S. Application Data

(63) Continuation of application No. 10/390,270, filed on Mar. 14, 2003, now Pat. No. 6,980,949.

(51) Int. Cl.
*G06F 17/27* (2006.01)
*G10L 15/18* (2006.01)

(52) U.S. Cl. .......................... 704/9; 704/257

(58) Field of Classification Search ........................ None
See application file for complete search history.

(56) References Cited

U.S. PATENT DOCUMENTS

| | | | |
|---|---|---|---|
| 4,703,425 A * | 10/1987 | Muraki | 704/7 |
| 4,742,481 A | 5/1988 | Yoshimura | |
| 4,887,212 A | 12/1989 | Zamora et al. | |
| 4,994,967 A | 2/1991 | Asakawa | |
| 5,083,268 A | 1/1992 | Hemphill et al. | |
| 5,099,426 A * | 3/1992 | Carlgren et al. | 704/9 |

(Continued)

OTHER PUBLICATIONS

Andreasen, T., "Query Evaluation Based on Domain-Specific Ontologies", IEEE, 2001.

(Continued)

*Primary Examiner*—David R Hudspeth
*Assistant Examiner*—Brian L Albertalli
(74) *Attorney, Agent, or Firm*—Ashok Mannava & Kang, P.C.; Ashok Mannava

(57) ABSTRACT

A computer program product for controlling the computer's processor to perform responsive actions a natural language input has: (1) vocabulary, phrase and concept databases of words, phrase and concepts, respectively, that can be recognized in the inputted communication, wherein each of these database elements is representable by a designated semantic symbol, (2) means for searching the inputted communication to identify the words in the communication that are contained within the vocabulary database, (3) means for expressing the communication in terms of the word semantic symbols that correspond to each of the words identified in the inputted communication, (4) means for searching the communication when expressed in terms of its corresponding word semantic symbols so as to identify the phrases in the communication that are contained within the phrase database, (5) means for expressing the communication in terms of the phrase semantic symbols that correspond to each of the phrases identified in the communication, (6) means for searching the communication when expressed in terms of its corresponding phrase semantic symbols so as to identify the concepts in the communication that are contained within the concept database, and (7) means for expressing the communication in terms of the concept semantic symbols that correspond to each of the concepts identified in the inputted communication, wherein these concept semantic symbols are recognizable by the processor and can cause the processor to take action responsive to the inputted communication.

17 Claims, 16 Drawing Sheets

U.S. PATENT DOCUMENTS

| | | | |
|---|---|---|---|
| 5,122,951 A * | 6/1992 | Kamiya | 704/9 |
| 5,151,857 A * | 9/1992 | Matsui | 704/9 |
| 5,285,386 A | 2/1994 | Kuo | |
| 5,349,526 A | 9/1994 | Potts, Sr. et al. | |
| 5,383,121 A | 1/1995 | Letkeman | |
| 5,590,317 A | 12/1996 | Iguchi et al. | |
| 5,608,624 A | 3/1997 | Luciw | |
| 5,644,774 A | 7/1997 | Fukomochi et al. | |
| 5,694,523 A | 12/1997 | Wical | |
| 5,737,733 A | 4/1998 | Eller | |
| 5,774,845 A | 6/1998 | Ando et al. | |
| 5,787,386 A * | 7/1998 | Kaplan et al. | 704/8 |
| 5,794,050 A | 8/1998 | Dahlgren et al. | |
| 5,873,056 A | 2/1999 | Liddy et al. | |
| 5,878,386 A | 3/1999 | Coughlin | |
| 5,893,102 A | 4/1999 | Maimone et al. | |
| 5,963,940 A | 10/1999 | Liddy et al. | |
| 5,995,921 A | 11/1999 | Richards et al. | |
| 6,026,388 A | 2/2000 | Liddy et al. | |
| 6,052,656 A | 4/2000 | Suda et al. | |
| 6,081,774 A | 6/2000 | De Hita et al. | |
| 6,108,620 A | 8/2000 | Richardson et al. | |
| 6,112,168 A | 8/2000 | Corston et al. | |
| 6,178,396 B1 | 1/2001 | Ushioda | |
| 6,188,977 B1 | 2/2001 | Hirota | |
| 6,219,643 B1 | 4/2001 | Cohen et al. | |
| 6,236,959 B1 | 5/2001 | Weise | |
| 6,275,791 B1 | 8/2001 | Weise | |
| 6,292,767 B1 | 9/2001 | Jackson et al. | |
| 6,314,411 B1 | 11/2001 | Armstrong | |
| 6,317,707 B1 | 11/2001 | Bangalore et al. | |
| 6,321,190 B1 | 11/2001 | Bernardes et al. | |
| 6,393,428 B1 | 5/2002 | Miller | |
| 6,434,524 B1 | 8/2002 | Weber | |
| 6,434,552 B1 | 8/2002 | Leong | |
| 6,442,522 B1 | 8/2002 | Carberry | |
| 6,466,899 B1 | 10/2002 | Yano et al. | |
| 6,499,013 B1 | 12/2002 | Weber | |
| 6,505,157 B1 | 1/2003 | Elworthy | |
| 6,539,348 B1 | 3/2003 | Bond et al. | |
| 6,556,973 B1 * | 4/2003 | Lewin | 704/277 |
| 6,556,982 B1 * | 4/2003 | McGaffey et al. | 706/50 |
| 6,980,949 B2 * | 12/2005 | Ford | 704/9 |
| 2002/0007267 A1 | 1/2002 | Batchilo et al. | |
| 2002/0022956 A1 | 2/2002 | Ukrainczyk et al. | |
| 2002/0128818 A1 | 9/2002 | Ho et al. | |
| 2002/0152202 A1 | 10/2002 | Perro et al. | |
| 2003/0101182 A1 | 5/2003 | Govrin et al. | |

OTHER PUBLICATIONS

Aust, H. et al., "Database Query Generation From Spoken Sentences", 2nd IEEE Workshop on Interactive Voice Technology for Telecommunications Applications, Sep. 26, 1994.

Bellegarda, J. et al., "Natural Language Spoken Interface Control Using Data-Driven Semantic Inference", IEEE Transactions on Speech and Audio Processing, May 2003.

Grootjen, F., "Relational Indexing Using a Grammarless Parser", IEEE, 2001.

Kang, I. et al., "Database Semantics Representation for Natural Language Access", Proc. of the First International Symposium on Cyber Worlds, 2002.

Leroy, G. et al., "Meeting Medical Terminology Needs—The Ontology-Enhanced Medical Concept Mapper", IEEE Transaction on Information Technology in Biomedicine, Dec. 2001.

* cited by examiner

Sample of a Portion of a Word or Vocabulary Database

| Word | Semantic Symbol | Word | Semantic Symbol |
|---|---|---|---|
| Can | 009 | Happen | 039 |
| Could | 009 | Find | 040 |
| Would | 009 | Locate | 040 |
| Will | 010 | Hang | 041 |
| Shall | 010 | Hold | 041 |
| Got | 011 | Wait | 041 |
| Get | 012 | Moment | 043 |
| Find | 012 | Minute | 043 |
| Obtain | 012 | In | 044 |
| Acquire | 012 | On | 045 |
| Retrieve | 012 | Charge | 046 |
| Me | 018 | Print | 047 |
| I | 019 | Printout | 047 |
| List | 020 | Records | 048 |
| Show | 020 | Add | 049 |
| Tell | 031 | Create | 049 |
| Do | 034 | Prepare | 049 |
| Does | 035 | Post | 050 |
| Did | 036 | Forget | 051 |
| Doing | 037 | Skip | 052 |
| A | 038 | Located | 053 |
| An | 038 | Location | 053 |
| The | 038 | Busy | 054 |

*FIG. 2A*

Sample of a Portion of a Word or Vocabulary Database

| Word | Semantic Symbol | Word | Semantic Symbol |
|---|---|---|---|
| Allow | 055 | Out | 067 |
| Permit | 055 | Number | 068 |
| Let | 056 | Enter | 069 |
| See | 057 | Entered | 069 |
| View | 058 | Entering | 069 |
| Absolutely | 058 | Fill | 069 |
| OK | 059 | Put | 069 |
| Okay | 059 | Write | 069 |
| Okeydoke | 059 | Entire | 070 |
| Sure | 059 | Whole | 070 |
| Uh-huh | 059 | Contact | 071 |
| Yeah | 059 | Calculate | 072 |
| Yep | 059 | Compute | 072 |
| Yes | 059 | Figure | 072 |
| Yup | 059 | Cease | 073 |
| Check | 060 | Discontinue | 073 |
| Wanna | 061 | Quit | 073 |
| Never | 062 | Quitting | 073 |
| No | 062 | Stop | 073 |
| Move | 063 | Terminate | 073 |
| Down | 064 | Bye | 074 |
| Count | 065 | Farewell | 074 |
| Of | 066 | Goodbye | 074 |

*FIG. 2B*

Sample of a Portion of a Word or Vocabulary Database

| Word | Semantic Symbol | Word | Semantic Symbol |
|---|---|---|---|
| Good-bye | 074 | Assign | 087 |
| I'm | 075 | Distribute | 087 |
| Time | 076 | Though | 088 |
| Daily | 077 | Nothing | 089 |
| Day | 077 | Not | 090 |
| Many | 078 | Thing | 091 |
| Due | 079 | Something | 092 |
| Receivable | 079 | File | 093 |
| Receipt | 080 | Files | 093 |
| Received | 080 | Folder | 093 |
| Receipt | 080 | Record | 093 |
| Receipts | 080 | Between | 094 |
| Anything | 081 | At | 095 |
| Date | 082 | More | 096 |
| Dated | 083 | Greater | 097 |
| Done | 084 | Than | 098 |
| Fini | 084 | Case | 099 |
| Finis | 084 | Order | 099 |
| Finished | 084 | Ordered | 099 |
| End | 085 | Ordering | 099 |
| Finish | 085 | Sort | 099 |
| For | 086 | Sorted | 099 |
| Apply | 087 | Sorting | 099 |

FIG. 2C

Sample of a Portion of a Phrase Database

| Words of Phrase | Semantic Symbol for Phrase | Semantic Symbols for Words |
|---|---|---|
| I must | a001 | 019 009 |
| I will | a001 | 019 010 |
| I need | a002 | 019 024 |
| I would need | a002 | 019 009 024 |
| I shall have | a002 | 019 010 013 |
| I do need | a002 | 019 010 013 |
| I would like | a002 | 019 009413 |
| Will I | a003 | 010 019 |
| Could I | a003 | 009 019 |
| Can I | a003 | 309 019 |
| May I | a003 | 002 019 |
| Will I have | a003 | 010 019 013 |
| Will I need | a003 | 010 109 024 |
| Who | a070 | 300 |
| What | a072 | 199 |
| How much is | a072 | 015 032 025 |
| How much does | a072 | 015 032 035 |
| When was | a078 | 239 025 |
| How much is | a072 | 015 032 025 |
| What is | a072 | 199 025 |
| What does | a072 | 199 025 |

*FIG. 3A*

Sample of a Portion of a Phrase Database

| Words of Phrase | Semantic Symbol for Phrase | Semantic Symbols for Words |
|---|---|---|
| In what | a072 | 044 199 |
| Where | a075 | 302 |
| Where is | a075 | 302 025 |
| Which | a076 | 255 |
| Which is | m076 | 255 025 |
| The task | m005 | 038 202 |
| A new task | m005 | 038 193 128 |
| a new task item | m005 | 038 193 128 279 |
| an appointment | m008 | 038 202 |
| a new appointment | m009 | 038 193 202 |
| my to do list | m005 | 038 031 034 020 |
| The to do list | m005 | 038 031 034 020 |
| The contact file | m703 | 038 1 00093 |
| My contact file | m703 | 641 071 093 |
| A new contact | m703 | 038 193 071 |
| Account statement | m800 | 695 115 |
| The account statement | m800 | 038 695 115 |
| The statement | m800 | 038 115 |

FIG. 3B

Significance of Alphanumeric Character Used In Phrase Semantic Representations

| Semantic codes for Phrases beginning with Character | Identifying Significance |
|---|---|
| a | Initial Phrases beginning with "I" |
| b | Initial Phrases beginning with "you" |
| c | Ending phrases containing "me" |
| d | Ending phrases containing "you" |
| e | Initial phrases starting with "it", "that" |
| f | Verbs, both with infinitive an without |
| g | Task specific phrase, e.g., "nothing else" |
| h | Time phrases |
| l | Task specific phrase (e.g., "info on") which is included in deep structure analysis |
| m | Primary object noun phrases |
| n | Secondary object noun phrases |
| o | Ordinals |
| u | Task specific phrase (e.g., "that I need") that is not included in deep structure analysis |

*FIG. 4*

Sample Portion of a Concept Database

| Words of Concept | Concept Expressed In Terms of Phrase Semantic Symbols | Semantic Symbol for Concept |
|---|---|---|
| Let me look at | a010 f160 | AA |
| I must see | a001 f160 | AA |
| I want to change | a002 f050 | AL |
| Can you change | b003 f150 | AL |
| Can you activate it | b003 f151 e001 | AV |
| Is there anyone | f100 e021 j001 | BW |
| I would like you to check | a002 d001 f066 | CH |
| Can you check | b003 f166 | CH |
| Let me continue | a010 f181 | CN |
| I want you to count | A002 D001 F072 | CN |
| Go ahead and start dictation | e003 f176 l075 | DA |
| I want to start dictating | a002 f076 f175 | DA |
| You can stop dictation | b012 f077 l075 | DB |
| Can I delete | a002 f115 | DD |
| Don't listen for a moment | g033 g012 | DL |
| Would you do | b003 f122 | DO |
| I want to enter | a002 f020 | EN |
| Let me make an entry for | a010 f122 | EN |
| How many | a077 | GG |
| Can you show me how many | b003 f310 c001 a077 | GG |

*FIG. 5A*

Sample Portion of a Concept Database

| Words of Concept | Concept Expressed In Terms of Phrase Semantic Symbols | Semantic Symbol for Concept |
|---|---|---|
| Would you get me | b003 f110 | GM |
| I want you to get | a002 d001 f110 | GM |
| That's good | e010 g023 | GO |
| Can you give me | b003 f310 c001 | GV |
| Hello | s001 | HE |
| How far is it from | l121 f100 e001 | HF |
| Would you hide | b003 f145 | HH |
| Just a minute | g012 | HI |
| Give me a minute | f310 c001 g012 | HI |
| I want you to make it | a002 d001 f025 | MA |
| Move up | f1092 | MU |
| Let me schedule | a101 f221 | PL |
| I want you to print | a002 f132 | PR |
| Stop | g000 | QU |
| Can I stop | a002 g000 | QU |
| Are you ready | g013 | RE |
| Would you read me | b003 f146 c001 | SA |
| Save it | f148 e001 | SV |
| Can you tell me who | b003 f144 c001 a070 | W! |

*FIG. 5B*

From a vocabulary database, the semantic symbol for each word is retrieved yielding a word semantic symbol array or an "input" vector such as:

| | |
|---|---|
| I | 019 |
| would | 009 |
| like | 143 |
| to | 031 |
| get | 012 |
| my | 038 |
| 401k | 803 |
| account | 695 |
| balance | 217 |

*FIG. 6*

The order of searching the expression "I would like to get my 401k account balance" for phrases is illustrated below:

| 1st Search | 019 009 143 031 012 038 803 695 217 |
|---|---|
| 2nd | 019 009 143 031 012 038 803 695 |
| 3rd | 019 009 143 031 012 038 803 |
| 4th | 019 009 143 031 012 038 |
| 5th | 019 009 143 031 012 |
| 6th | 019 009 143 031 – Match Found – a002 |
| 7th | 012 038 803 695 217 |
| 8th | 012 038 803 695 |
| 9th | 012 038 803 |
| 10th | 012 038 |
| 11th | 012   Match Found – fl 10 |
| 12th | 038 803 695 217 – Match Found – ml 17 |

Thus, the communication "I would like to get my 401k account balance" is presented in phrase semantic symbols as "a002 fl 10 ml 17"

*FIG. 7*

```
else if(action=="W2")
{
//what are my active tasks
if(descriptorA == "m025" || descriptorA == "m005")
{
if(descriptorB == "n906")
{
ReadActiveTasks();
}
}
else if(descriptorA =="m028")
{
//check for error in date - if so, dont speak SpeakAppointmentsForDate(LanguageProcessor.ProcessDate(unknownItemPhrase));
}
```

Example of the data space reduction (i.e., the means by which the present invention deals with all of the various ways that words can be combined to convey a concept) capabilities of the present invention: 300 recognized inputs from the various communications that are represented by the phrase semantic symbols "a002 f110."

| | |
|---|---|
| I will need to get | we shall want to find |
| I will need to find | we shall want to retrieve |
| I will need to retrieve | we shall want to acquire |
| I will need to acquire | we shall want to obtain |
| I will need to obtain | I need to get |
| I will wish to get | I need to find |
| I will wish to find | I need to retrieve |
| I will wish to retrieve | I need to acquire |
| I will wish to acquire | I need to obtain |
| I will wish to obtain | I wish to get |
| I will want to get | I wish to find |
| I will want to find | I wish to retrieve |
| I will want to retrieve | I wish to acquire |
| I will want to acquire | I wish to obtain |
| I will want to obtain | I want to get |
| I shall need to get | I want to find |
| I shall need to find | I want to retrieve |
| I shall need to retrieve | I want to acquire |
| I shall need to acquire | I want to obtain |
| I shall need to obtain | we need to get |
| I shall wish to get | we need to find |
| I shall wish to find | we need to retrieve |
| I shall wish to retrieve | we need to acquire |
| I shall wish to acquire | we need to obtain |
| I shall wish to obtain | we wish to get |
| I shall want to get | we wish to find |
| I shall want to find | we wish to retrieve |
| I shall want to retrieve | we wish to acquire |
| I shall want to acquire | we wish to obtain |
| I shall want to obtain | we want to get |
| we will need to get | we want to find |
| we will need to find | we want to retrieve |
| we will need to retrieve | we want to acquire |
| we will need to acquire | we want to obtain |
| we will need to obtain | I have got to get |
| we will wish to get | I have got to find |
| we will wish to find | I have got to retrieve |
| we will wish to retrieve | I have got to acquire |
| we will wish to acquire | I have got to obtain |
| we will wish to obtain | we have got to get |
| we will want to get | we have got to find |
| we will want to find | we have got to retrieve |
| we will want to retrieve | we have got to acquire |
| we will want to acquire | we have got to obtain |
| we will want to obtain | I could need to get |
| we shall need to get | I could need to find |
| we shall need to find | I could need to retrieve |
| we shall need to retrieve | I could need to acquire |
| we shall need to acquire | I could need to obtain |
| we shall need to obtain | I could wish to get |
| we shall wish to get | I could wish to find |
| we shall wish to find | I could wish to retrieve |
| we shall wish to retrieve | I could wish to acquire |
| we shall wish to acquire | I could wish to obtain |
| we shall wish to obtain | I could want to get |
| we shall want to get | I could want to find |

*FIG. 10A*

I would need to acquire
I would need to obtain
I would wish to get
I would wish to find
I would wish to retrieve
I would wish to acquire
I would wish to obtain
I would want to get
I would want to find
I would want to retrieve
I would want to acquire
I would want to obtain
I should need to get
I should need to find
I should need to retrieve
I should need to acquire
I should need to obtain
I should wish to get
I should wish to find
I should wish to retrieve
I should wish to acquire
I should wish to obtain
I should want to get
I should want to find
I should want to retrieve
I should want to acquire
I should want to obtain
we can need to get
we can need to find
we can need to retrieve
we can need to acquire
we can need to obtain
we can wish to get
we can wish to find
we can wish to retrieve
we can wish to acquire
we can wish to obtain
we can want to get
we can want to find
we can want to retrieve
we can want to acquire
we can want to obtain
we could need to get
we could need to find
we could need to retrieve
we could need to acquire
we could need to obtain
we could wish to get
we could wish to find
we could wish to retrieve
we could wish to acquire
we could wish to obtain
we could want to get
we could want to find
we could want to retrieve
we could want to acquire
we could want to obtain
we would need to get
we would need to find
we would need to retrieve
we would need to acquire
we would need to obtain
we would wish to get
we would wish to find
we would wish to retrieve
we would wish to acquire we would wish to obtain
we would want to get
we would want to find
we would want to retrieve
we would want to acquire
we would want to obtain
we should need to get
we should need to find
we should need to retrieve
we should need to acquire
we should need to obtain
we should wish to get
we should wish to find
we should wish to retrieve
we should wish to acquire
we should wish to obtain
we should want to get
we should want to find
we should want to retrieve
we should want to acquire
we should want to obtain
I will have to get
I will have to find
I will have to retrieve
I will have to acquire
I will have to obtain
I shall have to get
I shall have to find
I shall have to retrieve
I shall have to acquire
I shall have to obtain
we will have to get
we will have to find
we will have to retrieve
we will have to acquire
we will have to obtain
we shall have to get
we shall have to find
we shall have to retrieve
we shall have to acquire
we shall have to obtain
do I need to get
do I need to find
do I need to retrieve
do I need to acquire
do I need to obtain
do I wish to get
do I wish to find
do I wish to retrieve
do I wish to acquire
do I wish to obtain
do I want to get
do I want to find
do I want to retrieve
do I want to acquire
do I want to obtain
do we need to get
do we need to find
do we need to retrieve
do we need to acquire
do we need to obtain
do we wish to get
do we wish to find
do we wish to retrieve
do we wish to acquire
do we wish to obtain

FIG. 10B do we want to get
do we want to find
do we want to retrieve
do we want to acquire
do we want to obtain
I've got to get
I've got to find
I've got to retrieve
I've got to acquire
I've got to obtain
I'd need to get
I'd need to find
I'd need to retrieve
I'd need to acquire
I'd need to obtain
I'd wish to get
I'd wish to find
I'd wish to retrieve
I'd wish to acquire
I'd wish to obtain
I'd want to get
I'd want to find
I'd want to retrieve
I'd want to acquire
I'd want to obtain
I would like to get
I would like to find
I would like to retrieve
I would like to acquire
I would like to obtain I should like to get
I should like to find
I should like to retrieve
I should like to acquire
I should like to obtain
we would like to get
we would like to find
we would like to retrieve
we would like to acquire
we would like to obtain
we should like to get
we should like to find
we should like to retrieve
we should like to acquire
we should like to obtain
i'd like to get
i'd like to find
i'd like to retrieve
i'd like to acquire
i'd like to obtain

*FIG. 10C*

MULTI-STAGE PATTERN REDUCTION FOR NATURAL LANGUAGE PROCESSING

PRIORITY

This application is a continuation under 35 USC 120 of U.S. patent application Ser. No. 10/390,270, filed Mar. 14, 2003, now U.S. Pat. No. 6,980,949 entitled, "Natural Language Processor" by W. Randolph Ford which is incorporated by reference in its entirety.

CROSS-REFERENCE TO RELATED APPLICATION

This application is related to U.S. patent application Ser. No. 09/996,887, filed Nov. 30, 2001 and entitled "Multi-Stage Reduction System & Method for Processing Natural Language." The teachings of this application are incorporated herein by reference to the extent that they do not conflict with the teaching herein.

BACKGROUND OF THE INVENTION

1. Field of the Invention

The present invention relates to data processing and speech signal processing. More particularly, this invention relates to methods, systems and algorithms that provide a computer interface for converting users' natural language messages, that are entered into the interface via speech and handwriting recognition software or by the use of a keyboard, into a query or command that can be processed by a computer.

2. Description of the Related Art

The need for and advantages of an improved interface with a computer have long been recognized. Thus, many complex methods and algorithms for processing natural language have been developed.

There are two primary approaches being used today in natural language processing. The approach with the longest history is "parsing techniques." In this approach, a user's speech input is processed in a manner very similar to the method of making sentence diagrams that are often learned in grammar school. That is, the input is scanned for a possible subject, verb, direct object, etc. in an attempt to fit the input against a recognized structure in a rule-based table.

Natural language processors using this approach are characteristically very large and require a great deal of processing power to operate. Their strength is that they allow for the identification of unknown objects in an input. For example, in the user input "Get me the phone number for Bob." A parsing system can very efficiently identify the action ("get"), the directionality (implied by "me"), the object ("the phone number"), and the preposition ("for"). This leaves the noun "Bob" which a parsing system can easily use as an argument or parameter in searching a database without ever having seen this noun within the parsing tables. This is possible because parsing systems have the ability to eliminate all things understood through their extensive processing.

Unfortunately, the greatest weakness of parsing systems is their inefficient accommodation of users' variability of expression. There are literally thousands of ways that a user might ask for a phone number, and parsing systems are not very efficient, or even capable of accepting different users unique expressions of a concept. As such systems accommodate more and more various ways that a concept might be expressed, they increase markedly in size and in processing power required for their operation. That any such system could accommodate the user input "Would you go ahead and get me the phone number for Bob from my contact list?" is highly unlikely. Moreover, because parsing systems are very much rule-based, it is difficult for such systems to process ungrammatical or incomplete messages.

Today, many companies offering speech recognition technology attempt to circumvent the "variability of expression" problem by employing subsets of language. In one approach, spoken input is analyzed for keywords. Keywords are then matched with application functionality. In another approach, application users are expected to learn a set of specific commands that are matched with application functionality.

Systems that analyze keywords typically operate with a much higher degree of understanding than parsing systems. For example, in this keyword approach, assume the user inputs "Would you go ahead and get me the phone number for Bob from my contact list?" the system ignores all words except "get", "phone number", "Bob", and "contact list".

This approach provides a very efficient system for skirting the "variability of expression" problem, but it does have serious limitations, one academic and one pragmatic. On the academic side, more complex inputs will baffle a keyword system. For example, if the user were to express him/herself as: "Rather than get me the phone number for Bob from the contact list, for now, I only need his address," the keyword system probably would be unable to process this request.

On the pragmatic side, a possibly greater problem in this approach is that the proper noun "Bob" must be in one's keyword tables in order to be recognized. This implies two critical issues: first, that such keyword systems are only good for information retrieval, and second, at some point, it may not be possible to accommodate all such possible nouns in one's keyword tables.

In light of these short-comings on natural language processing, a third approach has also come into use. The "educating the user" approach often takes the form of a series of restrictions on the type of verbal inputs allowed; with the result being restrictions that require one to speak his/her way through computer menus. These techniques have been available in commercial products for years, but have not achieved widespread acceptance. Many potential users continue to refuse to accept them because they apparently view such restriction methods as being inefficient, overly time consuming and not sufficiently user friendly.

In general, it can be said that when we use language with a computer, we expect the same particular levels of understanding from the computer as when we speak to another human. Correct understanding of natural language input information, which is an easy task for a human being, is clearly not being easily achieved by using any of the current conventional approaches.

Thus, despite the above noted prior art, a need continues to exist for improved methods, systems and algorithms which provide for an interface with a computer. Specifically, an efficient method is needed that can accommodate all of the various ways that a user might express a concept in trying to communicate with a computer.

3. Objects and Advantages

As a means to better understand the present invention, it is instructive to also consider the objects and advantages of the present invention.

It is an object of the present invention to provide an improved natural language interface that enables a computer to understand communications that are inputted into it.

It is an object of the present invention to provide an improved natural language, voice interface with a computer.

It is another object of the present invention to provide a natural language interface with a computer that possesses the ability to come close to human understanding of communications.

It is yet another object of the present invention to provide a natural language interface with a computer that can accommodate ungrammatical or incomplete sentences as input information.

It is an object of the present invention to provide a natural language interface with a computer that can resolve ambiguous information, such as which form of a word is meant when it can be used as either a noun or verb.

It is another object of the present invention to provide a natural language interface with a computer that can understand an input within a time period that is comparable to that which occurs in human-to-human verbal communications.

It is yet another object of the present invention to provide a natural language interface with a computer that can reduce a user's input down to a concept that is understandable by the computer's processor.

It is also an object of the present invention to provide a natural language interface with a computer that can operate efficiently within the memory and processing restrictions imposed by current state of the art personal computers.

These and other objects and advantages of the present invention will become readily apparent, as the invention is better understood by reference to the accompanying drawings and the detailed description that follows.

SUMMARY

The present invention is generally directed towards mitigating the limitations and problems identified with prior methods used to provide an interface for a computer. In accordance with the present invention, a preferred embodiment of this invention takes the form of a computer program for controlling a processor to generate actions in the processor which are responsive to a natural language communication input.

This computer program includes: (1) vocabulary, phrase and concept databases of words, phrase and concepts, respectively, that can be recognized in the inputted communication, wherein each of these database elements is representable by a designated semantic symbol, (2) means for searching the inputted communication to identify the words in the communication that are contained within the vocabulary database, (3) means for expressing the communication in terms of the word semantic symbols that correspond to each of the words identified in the inputted communication, (4) means for searching the communication when expressed in terms of its corresponding word semantic symbols so as to identify the phrases in the communication that are contained within the phrase database, (5) means for expressing the communication in terms of the phrase semantic symbols that correspond to each of the phrases identified in the communication, (6) means for searching the communication when expressed in terms of its corresponding phrase semantic symbols so as to identify the concepts in the communication that are contained within the concept database, and (7) means for expressing the communication in terms of the concept semantic symbols that correspond to each of the concepts identified in the inputted communication, wherein these concept semantic symbols are recognizable by the processor and are used by the processor so as to cause the processor to take action responsive to the inputted communication.

In other preferred embodiments of the present invention, the present invention can take the form of a method for generating data in a processor usable form as a result of having received a natural language communication input, or a computer user interface that generates data in a processor usable form from a natural language input.

Thus, there has been summarized above, rather broadly, the present invention in order that the detailed description that follows may be better understood and appreciated. There are, of course, additional features of the invention that will be described hereinafter and which will form the subject matter of any eventual claims to this invention.

BRIEF DESCRIPTION OF THE DRAWINGS

FIGS. 2(a)-(c) illustrate portions of the words in the vocabulary database or vocabulary lookup table of the present invention and the semantic symbols that are used to represent such words.

FIGS. 3(a)-(b) illustrate portions of the phrases in the phrase database or phrase lookup table of the present invention and the semantic symbols that are used to represent such phrases.

FIG. 4 identifies the significance of the alpha numeric characters used to introduce the semantic symbols for the phrases within the phrase database of the present invention.

FIGS. 5(a)-(b) illustrate a portion of the concepts in the concept database or concept lookup table of the present invention and the semantic symbols that are used in the present invention to represent such concepts.

FIG. 6 illustrates how the present invention converts or reduces a communication input to its representation as a vector comprised of the semantic symbols that correspond to the words of the inputted communication.

FIG. 7 illustrates the order of searching an inputted vector for phrases by a preferred embodiment of the algorithm of the present invention.

FIG. 8 illustrates computer code which utilizes the present invention's identification of the concepts in an inputted communication to direct the responsive action of a computer.

FIG. 9 illustrates the printout from a display screen of the present invention which shows the intermediate steps used by the software disclosed herein for entering into a computer the complex communication of "I would like to enter a credit card transaction and I want to create a new savings account with a balance of $860.20."

FIGS. 10(a)-(c) illustrate an example of the data space reduction that can be achieved by using a preferred form of the algorithm of the present invention.

DETAILED DESCRIPTION

Figure 1:
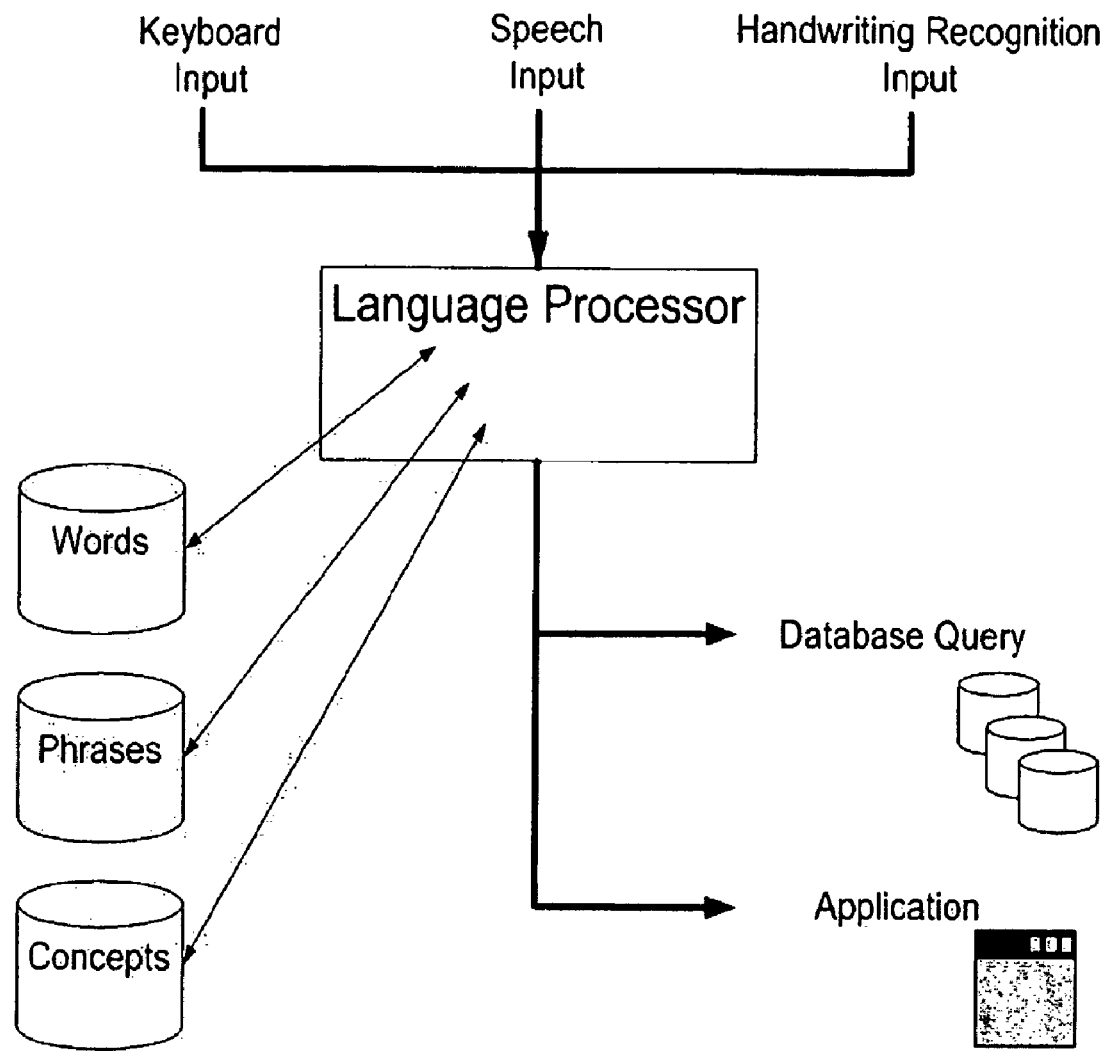
FIG. 1 illustrates a preferred embodiment of the present invention and the input and output devices with which it communicates.

Before explaining at least one embodiment of the present invention in detail, it is to be understood that the invention is not limited in its application to the arrangements of the component parts or process steps set forth in the following description or illustrated in the drawings. The invention is capable of other embodiments and of being practiced and carried out in various ways. Also, it should be understood that the phraseology and terminology employed herein are for the purpose of description and should not be regarded as limiting.

The biggest problem in creating a natural language processor is not having a processor understand the meaning of a finite set of words, or even being able to reduce a message down to the concept it conveys. It is, rather, dealing with all of the various ways that words are combined to convey a concept. In short, one must find a way to accommodate humans' variability of expression.

Working in the favor of one attempting to create a natural language processor, however, are a few facts. It has been said that the average person, while knowing tens of thousands of words and their meanings, uses fewer than two thousand unique words in the course of a day. Also, from studies of voice communication it is known that the average verbal message is between seven or eight words.

These facts can give us some idea of the size of the challenge that one faces in creating a natural language processor that can understand a person having a typical vocabulary and speaking in an average manner. Even assuming that we know which two thousand words an individual is going to use in a given day, such an individual could conceivably utter approximately 4.1.times.10.sup.20 distinct, nine word communications, assuming no repetition of words in these communications, (i.e., 2000.times.1999.times . . . times.1992 communications). Thus, the task of recognizing all the possible concepts contained within such an exceedingly large number of distinct communications seems initially to be quite unmanageable.

Given the great number of ways in which humans can combine words into messages, how could one possibly create a computer program to understand natural language? I have found that the answer lies in how information is organized in the human brain.

For decades, psychologists were under the impression that many chess masters, in addition to being very skilled at the game, must have photographic memories. This belief evolved because most chess masters exhibit the ability to precisely recall many of their past games—move for move. Additionally, chess masters themselves have often reported having such photographic memory capabilities.

However, after studying the chess masters' memory abilities more closely, it was discovered that such abilities have important limitations. For example, it was discovered that this chess board memorization skill was greatly diminished and eventually lost when the chess pieces were randomly placed on a chess board.

Thus, what appeared to be a feat of limitless memory was eventually seen to be a finite encoding of memory related to stages of cognition based on the rules by which chess pieces may be moved. For example, many knowledgeable chess players can glance at a chess board in the first three moves of a game and recognize it as such. Through study, the gifted chess master can apparently remember and recognize the pieces on a chess board as being those associated with one of the many possible combinations achievable after a much higher number of moves.

This chess example is also appropriate because it is represents an area in which great displays of human intelligence have been apparently simulated by a computer. However, this apparent simulation proves to really be more akin to mimicking of human intelligence through the use of pattern reduction techniques. By utilizing snap shots of recognized chess patterns generated by humans, one is thereby able to give a computer an appearance of intelligence, an artificial intelligence, in its attempts at solving chess problems. I say appearance because there is in fact nothing intelligent about what the computer is doing in such chess matches (i.e., the computer chooses among the patterns in its database to best respond to any placement of the chess pieces on a chess board). The computer's behavior fails even the simplest of definitions of intelligence (e.g., Piaget: "Intelligence is that thing we use when we don't know what to do").

The nature of intelligence, however, is not the focus of the present invention. Rather, the present invention addresses the problem of how to take all of the possible random generations of language and identify which of these are actually meaningful. Through the use of pattern recognition, intertwined with sorting and repeated simplification and classification of communications, the present invention seeks to find a meaningful and functional process by which one can reduce human communication down to its base meaning, i.e., the concepts being communicated.

Natural language processing, the subject of the present invention, has been an area of interest for the inventor for some time. His early inventive efforts in this field and an early overview of this field are given in "Natural-Language Processing By Computer: A New Approach," the inventor's Ph.D. dissertation submitted to The Johns Hopkins University, Baltimore, Md. in 1981. The teachings and disclosure of this work are hereby incorporated by reference.

In a preferred embodiment, the present invention takes the form of a piece of computer software that is used behind a standard piece of voice or handwriting recognition software. Such recognition software is assumed to convert the words sensed by the computer's input device and to store them in a memory device in the form of the properly spelled words.

Alternatively, the language processor software of the present invention can analyze and respond to the input that is entered into a computer by one's use of a keyboard or other data entry device that results in properly spelled sentences, questions, etc. being entered into a computer.

The language processor software version of the present invention consists of two different parts. One is a knowledge base, which is made up of three look-up tables (i.e., word, phrase and concept) or databases. The other part is the actual algorithm which is used for navigating this knowledge base to reduce a user's input down to an understandable concept. See FIG. 1.

Understanding of such concepts allows one to use them to direct a computer's actions. For example, in response to an understood question, a computer could find the answer to an understood question in a information database to which the computer has access.

Of the present invention's knowledge base, we first consider its "word" look-up table or its vocabulary database. To each word in this database we assign a semantic symbol. See FIGS. 2(a)-(c). In examining FIG. 2, it can be noted that more than one of the words in our base vocabulary can share the same semantic symbol.

The logic behind the semantic symbols that are assigned to the various words is explained as follows:

(a) If two words can be exchanged in a message without significantly changing the concept of the message, then those two words are deemed to be semantically equivalent. For example, one can observe that "want" and "need" can be exchanged in most uses without changing the concept communicated in a message: "I want to see my balance" and "I need to see my balance" communicate similar concepts. In fact, in most cases where "want" or "need" follow the pronoun "I" the meaning of these two words is equivalent.

(b) There is no significance to the code or number used in the semantic symbol representations of the words with the present invention's vocabulary database. The only requirement for such codes or numbers is that they be unique from the other numbers or codes that are used for other "nonequivalent" words in the vocabulary database.

For the purpose of explaining the logic of the present invention, we refer to communications such as "I want to see my balance" and "I need to see my balance" as "surface structures" that can be reduced down to a single concept or "deep structure" which is usually directed at a parameter or work object. For example, in the above communications the parameter or work object is "balance."

The words, phrases and concepts to be included in the databases of the various application-directed embodiments of the present invention are preferably identified as a result of frequency analyzing the words, phrases and concepts used in dyadic communications of the sort that occur during the goal-directed behavior (e.g., two communicators performing a task or jointly trying to solve a problem) applicable to the application or task for which a specific embodiment is sought. In some cases, the communications to be studied will be from situations where both communicators are human; in other cases, one communicator will be human and the other will be a computer. The communication to be analyzed in detail will be only that of the human.

Sources for these communications could be the technical literature that documents scientific studies of applicable communications, and voice interface simulations of human to computer interaction. Other sources could be applicable transcripts found online.

In the analyses, such communications are preferably processed through collocational algorithms to determine a number of characteristics or properties with respect to the frequency of the words, grouping of words, etc. used in these communications. For example, analysis of these communications will usually identify which words should be included in one's "word" database.

Additionally, it can be determined which words in these communications frequently appeared next to each other in chains of two words groupings, three words groupings and greater length groupings. These are identified as multi-word phrases (i.e., frequently occurring groupings of two or more words) for inclusion in our "phrase" database.

Also, if one assumes that a communication is comprised only of phrases and disregards trying to identified the various parts of speech (i.e., subjects, verbs, pronouns, etc.) of such communications, one is led to identify what I refer to as "single-word phases" (i.e., frequently verbs; words that appear in the "word" database and also in the "phrase" database) and to group adjectives with the words they modify for phrase identification purposes.

As an example, consider the following different "surface structures," which all share the same "deep structure," from an analysis of various recorded communications of individuals communicating with their checkbook balancing programs:

"I would like to see my checkbook balance,"
"I need to see my checkbook balance,"
"I will need to see my checkbook balance?"
"I am going to need to see my checkbook balance."

From my analysis of these communications, I associate the pronoun "I" with the words that followed it. For example:
"I would like to,"
"I need to,"
"I will need to," and
"I am going to need to"

Following this same sort of logic in grouping adjectives with the words they modify for phrase identification purposes, one sees that "my checkbook balance" can also be identified as a "phrase," and thus added to our phrase database.

For these communication examples, it then follows that the verb "see" will be classified as a single-word phrase and thus will appear in both our word and phrase databases.

FIGS. 3(a)-(b) show a portion of the phase database for one preferred embodiment of the present invention. As in the word database, to each phrase in this database there is assigned a phrase semantic symbol.

The logic behind the semantic symbols identified in this phrase database is explained as follows:

(a) If two phrases can be exchanged in a verbal communication without significantly changing its concept or deep structure, then those two phrases are deemed to be semantically equivalent and given the same semantic symbol. For example, semantic representations for "I want to" and "I would like to" can be exchanged in most uses without changing a message's deep structure.

(b) The semantic symbols that are associated with these phrases are constructed such that the first digit or alphanumeric character in these symbols has a special significance and identifies sub-groupings having a common feature. The balance of these numbers or codes for these symbols only needs to be unique from the other numbers or codes for the other phrases that are not semantically equivalent. The significance of this first digit lies in the manner in which it is used for grouping various types of phrases into classes for easy identification.

During my frequency studies of communications, I observed that the phrases that preceded and followed a verb phrase, which I denote as "wrapper phrases", functioned to determine the "directionality" of the deep structure's verb. For example, I distinguish the is following surface structures as having opposite directionalities:

"I must get my balance,"
"You need to get my balance for me."

In the first communication, the leading phrase identifies the one to whom the information about the balance must go. In the second communication, the leading phrase identifies the one who must do the work (i.e., "you," which is the computer being served by the language processor of the present invention) to get the information about the balance.

To distinguish these situations, I use a leading "a" to distinguish those leading wrapper phrases which identify the recipient of the computer's output, and a "b" to distinguish those leading wrapper phrases which identify the one to do the work. See FIGS. 3(a)-(b).

Similarly, I use a leading "c" to distinguish those trailing wrapper phrases which identify the recipient of the computer's output, e.g., "for me" is given the semantic representation of "c004" A "d" is used to distinguish those trailing wrapper phrases which identify the one to do the work, e.g., "from you" is given the semantic representation "d003".

In addition to leading wrapper and trailing wrapper phrases, my studies of communication have revealed that it proves useful to also identify pre-leading wrapper phrases that occasional occur with leading wrapper phrases. Such phrases are coded with the letter "e" such as e003 for "go ahead and".

Continuing with the identification of such sub-grouping of phrases, I have chosen to identify verbs by the letter "f," i.e., "get" is given the semantic representation "f110".

As I continued to utilize such sub-grouping, it became apparent to me that these leading alphanumeric characters could be used to direct how the algorithm of the present invention processes a particular phrase in a communication. For example, leading alphanumeric characters in the range of "a" through "l" are used in the present invention to help identify how such phrases communicate a concept.

Meanwhile, phrases with a leading alphanumeric that follows later in the alphabet than "l" are to be initially ignored by the algorithm as it seeks to identify the concept contained within an imputed communication. For example, phrases identified with a leading character of "m" are set aside as parameters that identify an object to which a phrase or concept is directed (e.g., "email message"—m003). Phrases identified with a leading character of "n" are phrases that identify a subcategory of information associated with an object that has been categorized as an "m" phrase (e.g., "the subject field of an email message"—n038).

Phrases identified with a leading character of "o" are set aside as parameters for identifying a specific object, such as "the last" or "the second". Phrases identified with a leading character of "u" are set aside as supplementary phrases, i.e., indicators of politeness (e.g., "please"—u004, "if you will"—u005) and other phrases peripheral to the initial identification of the concept of the inputted communication. See FIG. 4 for an abbreviated key that identifies the significance of the various alphanumeric characters used in the present invention.

As this sub-grouping of phrases moved forward, I discovered that I was able to easily identify and account for more and more of the variability in one's communications. Each time I identified a phrase and included it in my phrase database, I was effectively accounting for more and more of the variability of human expression. Taken to its extreme when all possible phrases are identified and placed in a phrase database, one is left with trying to analyze a communication in which the only unidentified pieces are the nouns or objects of the communication, e.g., when one is asking a computer to find certain information in its database, these nouns identify the information which is desired from the database.

Once one has a way to try to account for much of the variability of typical goal-directed communications, one is better prepared to try to identify the concepts or "deep structures" within such communications. Upon undertaking frequency analysis of phrase semantic symbols for many communications, I again discovered significant repetition in the format of these phrase semantic symbols. This led me to create a concept database in which I try to categorize the various types of concepts being communicated in typical goal-directed communications.

FIGS. 5(a)-(b) show a portion of a preferred embodiment for a concept database or a look-up table for use with the present invention. As in the prior databases, to each concept in this database there is assigned a semantic symbol. This proves to be especially useful when we are trying to understand communications having more than one concept. Also, if it happens that two concepts can be exchanged in a verbal communication without significantly changing its meaning, then those two concepts are deemed to be semantically equivalent and given the same concept semantic symbol.

With the above descriptions of the word, phrase and concept databases, it proves useful to consider further the algorithm used to analyze a communication directed at the natural language processor of the present invention. In order for the present invention to understand the concepts within a communication, semantic symbols from the software's vocabulary look-up table are used to replace the words comprising the inputted communication.

Care is given to arrange the symbols in the same order as their corresponding words which appeared in the inputted communication. See FIG. 6 for the semantic symbol representation of the input "I would like to get my 401k account balance."

For the purpose of this discussion, this symbolic representation of the inputted communication will be referred to as a word vector. This vector (i.e., 019 009 143 031 012 038 803 695 217) represents the semantic reduction of the words, or the first pattern reduction step in the algorithm of the present invention. It is important to note that this single vector can, in cases where there are multiple words corresponding to each semantic symbol, represent many different ways to express the same concept.

In the next step, the word vector (i.e., 019 009 143 031 012 038 803 695 217) is used to begin to search through a phrase database to create a phrase vector which is representative of the inputted communication, see FIGS. 3(a)-(b). The logic behind this search is explained as follows:

(a) The identification of phrases has a directionality to it—that is, one moves from left to right through the list of the semantic symbols that have been substituted for the words in the verbal communication of interest, wherein a semantic symbol appearing on the left indicates that its corresponding word was uttered before the word represented by the semantic symbol appearing to its right. One seeks to identify the largest or longest string possible of word semantic symbols from those phrases that have been compiled into the database of phrases.

(b) Having identified a first phrase at the beginning of our vector of semantic representations for words, our phrase identification search engine examines the semantic symbols that lie to the right of the identified phrase in order to identify any other recognizable phrases that appear in our phrase database—always trying to identify the longest possible strings of semantic representations.

Thus, for the word vector (e.g., 019 009 143 031 012 038 803 695 217) one initially searches for a match for the whole vector. Finding no match, one searches for a match for the whole vector minus the last, or furtherest right, semantic representation (i.e., 019 009 143 031 012 038 803 695), and, finding no match, again searches for a match for the whole vector minus the next-to-last semantic representation (i.e., 019 009 143 031 012 038 803). This process of searching the phrase table for phrases having ever shorter strings continues to be repeated until one finally finds a match (e.g., 019 009 143 031). See FIG. 7.

At this point, one takes the semantic symbol a002 and saves it in the first, or left-most, position of what is defined as a phrase vector.

The phrase searching process continues with the next set of semantic symbols to the right of the last symbol in the identified phrase (i.e., 012 038 803 695 217) being searched for a match in the phrase table. In the example at hand, one finds that only the single semantic symbol, 012 can be matched. It yields the phrase semantic symbol of f110.

This matching process continues until one finally find a match for the array of 038 803 695 217, which yields the phrase semantic symbol of m117. This combination of matched phrase semantic symbols is used to create the phrase vector: "a0002 f110 m117."

From searching for the concepts contained within such communications expressed by their phrase semantic symbol representations, I discovered many repeating patterns of phrases in such communications. For example, I often observed an "a" phrase preceding an "f" phrase followed by an "m" phrase" and a "d phrase," as in "I need to get my balance from you," which converted to phrase semantic symbols as "a002 f110 n801 d003."

This analysis led me to realize that initially ignoring some phrases made it easier to discern the concept or "deep structure" contained within a communication. This led to my decision to denoted these initially to be ignored phrases by assigning them a leading alphanumeric that follows later in the alphabet than "f."

When one gets to the point in the analysis of the inputted communication where they have clearly identified the recognizable phrases in an inputted communication (i.e., accounted for the possible variability within an inputted communication), one assumes that the remaining unidentifiable phrases are the specific identifying parameters for the objects within the communication. For example, the inputted query of "Get me the email address for Betty Mayfield" is translated by the present invention to the phrase vector: f110 c001 n832 "Betty Mayfield".

Setting aside the object part of this concept vector, one is now left with: f110 c001 n832. The present invention's process of discerning the meaning of such an expression continues by searching a concept database, such as that shown in FIG. 5.

The logic behind the manner in which the algorithm of the present invention searches these phrase vectors is given below:

(a) As with phrases, concept identification has a directionality to it—one searches from left to right through the list of semantic symbols for the phrases that comprise the inputted communication of interest and aims to identify the largest (or longest in terms of the number of phrase semantic symbols) concept possible. Having done this, the search engine of the present invention moves across the symbolic inputted communication to identify the next largest identifiable concept. In this manner our search engine is capable of identifying multiple concepts in a single communication.

(b) The semantic symbols that are associated with these concepts or "deep structures" consist of two, capitalized alphanumeric characters. There is no significance to these capitalized characters. The only requirement for them is that they be unique from the other characters that are used for other "nonequivalent" concepts in the concept database.

The algorithm of the present invention then uses the concepts identified within an inputted communication to direct the actions of the computer. For example, for the communication "Get me the email address for Betty Mayfield" and its representative phrase vector "f110 c001 n832 Betty Mayfield," one finds that the phrase combination "f110 c001" is found in the concept table, and is represented by the semantic symbol "GM" which stands for the command "Get me." Thus, the initial input can be expressed in our semantic symbols as "GM n832 Betty Mayfield."

The algorithm's identification of "GM" can be used to cause the computer to search its database for the object appearing behind the identified concept, i.e., the phrase n832 which is the semantic representation for "the email address." The computer responds by searching its database for "email address" and the fields by which these addresses are classified. If "Name" is found to be a field of classification for the emails, the computer will make an attempt to retrieve the email address for the record whose name matches the unidentified phrase "Betty Mayfield".

As another example of how this step proceeds, consider the situation where a user asks a computer that utilizes the natural language processor software of the present invention and that is attached to a personal information manager application "What are my active to do list items?" The software of the present invention converts this input into the semantic symbols "W2 n906 m025" where "W2" represents the deep structure for "What are", n906" represents the property "active", and "m025" represents the object "to do list items". This information can then be passed to a database in the form of a SQL query.

The computer code given in FIG. 8 is from just such a computer application. In it you can see that on the first line that the block of code following that line will be executed because the action does in fact equal "W2". Because the descriptor A on the second line down does in fact equal "m025" or the object "to do list items", the block of code next checks to see that descriptor B equals "n906" the property for "active. Given the satisfaction of these three conditions, the personal information manager application program communicates back the desired tasks that are still active.

As another example of how a preferred algorithm of the present invention operates, consider the action taken by an algorithm-directed computer in response to the following input: "I need to change the deposit date . . . it should be Jan. 22, 2003."

The difficulty in interpreting this input centers around how to interpret the pronoun "it" in the second part of the communication (i.e., an "explicit pronoun"). However, the algorithm of the present invention can accommodate this input by maintaining the context within which the communication is occurring. The context is maintained by holding the results of the initially inputted messages in place while a further message is awaited. Given an initial input "I need to change the deposit date," the algorithm converts this message into semantic symbols and searches for phrases and concepts. It represents the input as "AL m900 n808," where AL is the symbol for the concept "to change something," m900 is the symbol for the primary object, "deposit," and n805 is the symbol for secondary object "date." These are initially stored in a part of the computer's memory that is defined as the algorithm's "rolling contact manager." They are stored as, respectively, the action or concept, the primary object, and the secondary object of the communication.

When the user follows with "it should be Jan. 22, 2003", the natural language processor knows exactly what she or he is talking about with respect to "it". With the previously stored symbolic inputs, the algorithm of the present invention understands that the communicator or natural language processor user is implicitly referring to the "date."

The algorithm of the present invention is also seen to be able to handle communications that involve "implicit action" queries. For example, an inputted communication such as: "What is the average income for California? And the unemployment rate?, where in the second query both the deep structure "what is" and the object "California" are implicit.

The algorithm of the present invention accommodates such questions by again identifying the concepts (i.e., "what is," which is denoted as W2) and objects (i.e., primary object of "California," secondary object of "the average income") within the first part of this communication and storing them in memory. Thus the context of the communication is set.

When the user follows this query with a second question, "And the unemployment rate?", the phrase value for "unemployment rate" (another secondary object) replaces the previous secondary object "the average income". When the natural language processor of the present invention attempts to process the input void of a concept or deep structure, it reverts make to the saved values in context and realizes that it has a complete query therein. When the user asked "And the average unemployment rate?", the user was implicitly asking "What is the average income for California?" Everything one needs to determine this was saved in the "rolling context manager" of the present invention.

As yet another example of how a preferred algorithm of the present invention operates, consider the action taken by our algorithm-directed computer in response to the following input: "Can you tell me Betty's phone number?," where our natural language process must equate "Betty's phone number" with "the phone number of/for Betty."

In considering how the algorithm of the present invention can accommodate this "possessive noun" challenge, it is instructive to first consider what sort of "preprocessing" of the inputted communication is conducted by the present invention. For example, when, in examining the words that are inputted, the algorithm of the present invention encounters a contraction (e.g., I'll, you've), it converts such inputs to their non-contracted form's (e.g., I will, you have). This converted message is then processed as if it had never employed a contraction.

Similarly, this preprocessing step also entails converting possessive nouns and pronouns (e.g., Betty's, its) to specifically defined equivalents (e.g., of Betty, of it) which indicate the possessive without using an "s" or a "'s". Such converted messages are then processed as if it had never employed a possessive using an "s" or a "s".

Another task which the algorithm of the present invention accomplishes is some general selective editing, which can prove to be especially valuable when the communications are being verbally inputted into a computer. In such circumstances, it can often happen that the users of natural language processors will direct their verbal communications to others in the vicinity besides just the computer's input microphone (e.g., workers collaborating on a project could be discussing not only the work at hand, but also could pepper their conversation with comments about Sunday's football game, remarks directed at mocking their boss, and complaints about spouses).

The computer's audio input is then challenged to understand verbal communications that may have apparently disjointed thoughts and concepts. To resolve this situation, a preferred embodiment for the algorithm of the present invention will ignore that part of the verbal input which is outside of the context of the concept database that will have been created for a specific applicational use of the present invention. When the input is specific to the designed applicational use of the present invention, this natural language processor will search its "deep structures" or concept database and their associated objects to identify the proper action to be taken by the computer in response to the relevant or non-ignored input.

Figure 9:
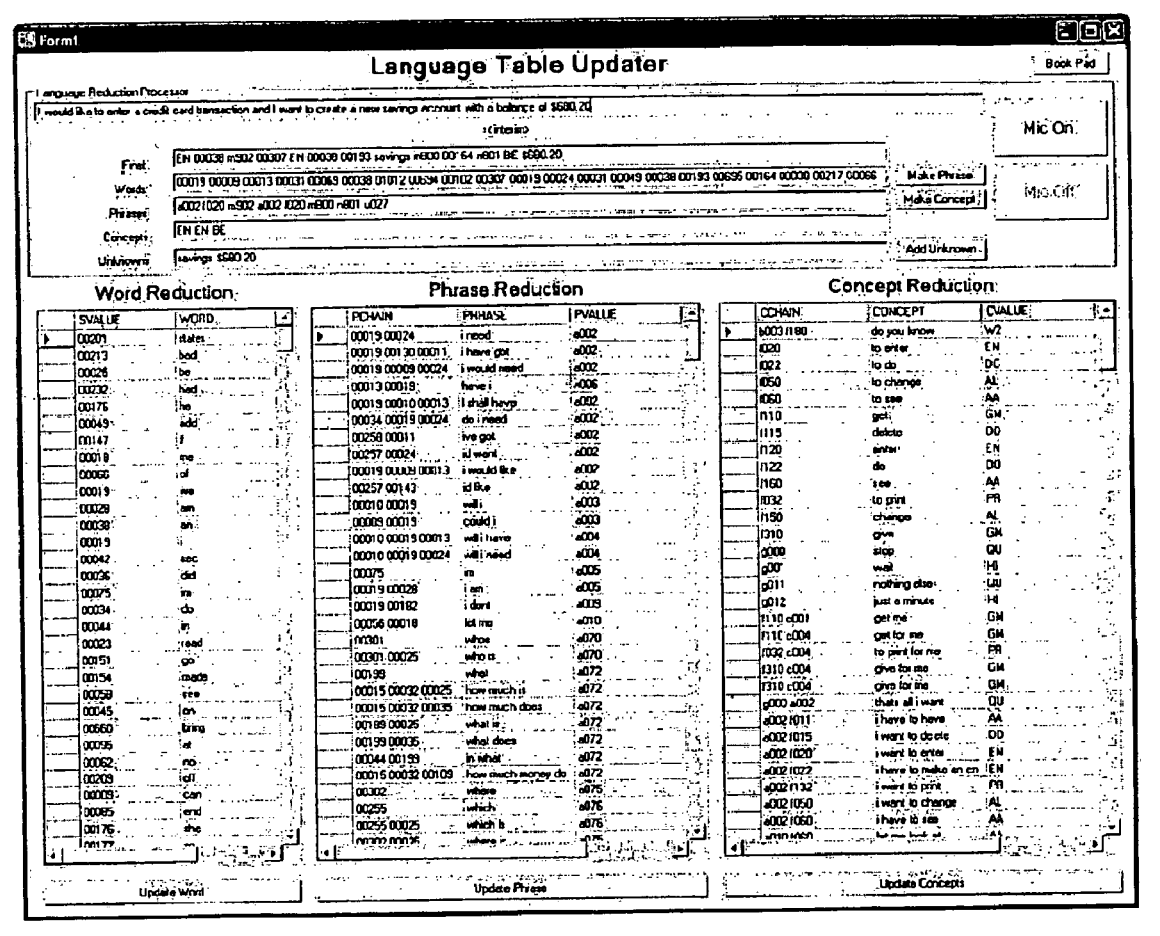

As previously mentioned, a preferred embodiment of the algorithm of the present invention can accommodate communications having multiple concepts. The means by which this is accomplished is illustrated in FIG. 9. This printout from a display screen of the present invention shows the intermediate steps used by the software disclosed herein for entering into a computer the complex communication: "I would like to enter a credit card transaction and I want to create a new savings account with a balance of $860.20."

The display screen is seen to have lines that show the semantic symbols generated at each stage of the algorithm's action on this input. On the line labeled "Final" one can see that the language processor of the present invention has correctly parsed this input as having two key concepts (i.e., enter and create), two primary objects (i.e., "credit card transaction" and account) and a secondary object (i.e., balance). The name of the "account" is the unrecognized word "savings," and the amount of the balance is the unrecognized "$680.20."

To better appreciate the interpretative power of the present invention, consider the power of the search conducted with just the phrases "a002 f110." When reviewing the information shown in the phrase database, one discovers that the phrases "a002 f110" represents over three hundred difference ways that a user might ask for his/her 401k account balance. Multiply this times the six ways the primary object "401k balance" can be represented and we have accommodated 1,800 different ways a user might ask for a specific piece of information with a single table entry and a complementary object. See FIGS. 10(a)-(c) for this illustrative example.

In an early demo application of the present invention, a specific application had an object vocabulary that consisted of 46 unique entries. For this application, we find that there 82,800 different ways of asking for these 46 unique pieces of information from the generalized concept symbolized by AA. Assuming that there are in fact 43 different table entries in the concept database for AA, the retrieval operation of the present invention can understand 3,560,400 different ways to ask for these 46 unique objects, all from a database with fewer than 1,500 symbolic entries across words, phrases, and concepts.

With thirty-one entries of different semantic symbols for various concepts, one finds that a table with 1,500 entries can represent over 100 million user inputs, in 1.2 megabyte of space. The present invention is thus seen to efficiently accommodate a wide range of variability in how a user might attempt to communicate a particular thought or concept.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention as hereinafter set forth in the claims.

What is claimed is:

1. A method for converting a natural language communication, said method comprising:
    a computer processor searching a natural language communication to identify words in said communication contained in a vocabulary database of words, wherein each of said database words is representable by a designated word semantic symbol and multiple different words in the vocabulary database determined to have a similar meaning are represented by the same semantic symbol in the vocabulary database;
    expressing said communication in terms of word semantic symbols from the vocabulary database that correspond to each of said words identified in said communication;
    searching said communication when expressed in terms of word semantic symbols so as to identify phrases in said communication contained in a phrase database of phrases, wherein each of said database phrases is representable by a designated phrase semantic symbol and multiple different phrases in the phrase database determined to have a similar meaning are represented by the same semantic symbol in the phrase database;
    expressing said communication in terms of phrase semantic symbols from the phrase database that correspond to each of said phrases identified in said communication;
    searching said communication when expressed in terms of the phrase semantic symbols so as to identify concepts in said communication; and
    expressing said communication in terms of concept semantic symbols that correspond to each of said concepts identified in said communication.

2. The method of claim 1, further comprising:
    upon identifying said concepts in said communication, causing the processor to take action responsive to said identified concepts into data that can be processed by the processor.

3. The method of claim 1, wherein searching said communication when expressed in terms of the phrase semantic symbols so as to identify concepts in said communication further comprises:
    searching said communication when expressed in terms of the phrase semantic symbols so as to identify concepts in said communication contained in a concepts database of concepts, wherein multiple different phrases corresponding to the same concept are represented by the same semantic symbol in the concepts database.

4. The method of claim 1, wherein the natural language communication comprises an audio communication.

5. The method of claim 1, wherein the natural language communication comprises a user instruction to a computer system, and the method further comprises:

determining the instruction from the identified concepts.

6. An apparatus comprising:

means for receiving a communication;

means for storing semantic representations of at least words, phrases, and concepts, wherein multiple different words determined to have a similar meaning are represented by the same semantic representation stored in the means for storing and multiple different phrases determined to have a similar meaning are represented by the same semantic representation stored in the means for storing; and means for determining a semantic representation of the communication using the semantic representations for words, phrases, and concepts stored in the means for storing, wherein the means for determining a semantic representation is further operable to perform at least a three-stage reduction of the communication to determine the semantic representation of the communication using words, phrases, and concepts and corresponding semantic representations stored in the means for storing.

7. The apparatus of claim 6, wherein the semantic representation of the communication includes semantic representations of stored concepts.

8. The apparatus of claim 7, further comprising:

processor means for taking action in response to the stored concepts identified from the semantic representations.

9. A method for performing a multistage reduction of a communication, the method comprising:

receiving the communication at a computer, wherein the communication includes at least one concept expressed in words;

performing a multistage reduction of the communication to determine a semantic representation of the communication, wherein the multistage reduction includes at least using stored words, phrases, and concepts and corresponding semantic representations to semantically represent the communication wherein each of said stored words is represented by one of the stored semantic representations and multiple different words determined to have similar meanings are represented by the same stored semantic representation, and each of said stored phrases is represented by one of the stored semantic representations and multiple different phrases determined to have similar meanings are represented by the same stored semantic representation; and using the semantic representation of the communication to identify a proper action to be taken by the computer.

10. The method of claim 9, wherein the multistage reduction includes using each of the stored words, phrases, and concepts at different stages of the multistage reduction.

11. The method of claim 9, wherein performing a multistage reduction at least comprises:

determining whether any of the stored words are in the communication;

for any of the stored words in the communication, identifying corresponding word semantic symbols representing the stored words;

using the word semantic symbols to identify stored phrases corresponding to the stored words in the communication, wherein the stored phrases are represented as phrase semantic symbols;

using the phrase semantic symbols corresponding to the identified phrases to identify corresponding stored concepts for the communication.

12. The method of claim 11, wherein the stored concepts are represented as concept semantic symbols, the method further comprising:

expressing the identified stored concepts as the corresponding concept semantic symbols.

13. The method of claim 11, wherein identifying corresponding word semantic symbols representing the stored words comprises:

searching a vocabulary database using to identify the corresponding word semantic symbols representing the stored words, wherein multiple words in the vocabulary database determined to be exchangeable without significantly changing a concept in a communication are represented by a same semantic symbol in the vocabulary database.

14. The method of claim 13, wherein identifying stored phrases corresponding to the stored words in the communication comprises:

searching a phrase database using the identified words semantic symbols to identify the corresponding phrase semantic symbols associated with the identified words, wherein multiple phrases in the phrase database determined to be exchangeable without significantly changing a concept in a communication are represented by a same semantic symbol in the phrase database.

15. The method of claim 14, wherein identify corresponding stored concepts for the communication comprises:

searching a concept database using the identified phrase semantic symbols to identify corresponding concept semantic symbols associated with the identified phrases, wherein multiple concepts in the concepts database determined to be exchangeable without significantly changing a concept in a communication are represented by a same semantic symbol in the concept database.

16. The method of claim 9, wherein the semantic representation of the communication identifies concepts in the communication, and the proper action to be taken by the computer is determined based on the identified concepts.

17. The method of claim 9, wherein the received communication comprises an audio communication.

* * * * *